United States Patent [19]

Hammond et al.

[11] 4,103,256
[45] Jul. 25, 1978

[54] AZACOUMARIN DYE LASERS

[75] Inventors: Peter R. Hammond, Livermore; Ronald L. Atkins, Ridgecrest; Ronald A. Henry, China Lake; Aaron N. Fletcher, Ridgecrest, all of Calif.

[73] Assignee: The United States of America as represented by the United States Department of Energy, Washington, D.C.

[21] Appl. No.: 689,889

[22] Filed: May 25, 1976

[51] Int. Cl.$^2$ .............................................. H01S 3/20
[52] U.S. Cl. ........................... 331/94.5 L; 260/295 F; 544/111
[58] Field of Search ............... 331/94.5 L; 260/295 F, 260/247.2 B, 343.2 R

[56] References Cited

U.S. PATENT DOCUMENTS 3,891,569   6/1975   Schimitschek et al. ........ 331/94.5 L Primary Examiner—William L. Sikes
Assistant Examiner—Marcus S. Rasco
Attorney, Agent, or Firm—Dean E. Carlson; Roger S. Gaither; Irene S. Croft

[57] ABSTRACT

A dye laser comprising a laser dye solution of a compound having the general structure:

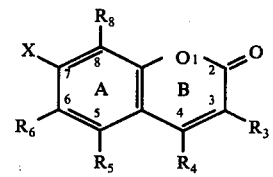

wherein at least one of the 5, 6 and 8 ring positions is occupied by a nitrogen atom in lieu of the corresponding CR group and X is OH, alkoxy, or amino including amino substituted by at least one of the following: alkyl, aryl, acyl, aracyl, a group which taken together with the nitrogen atom of the amino group forms a heterocyclic ring, or part of one or two 5 or 6 membered aliphatic heterocyclic rings attached to ring A at positions 6 or 8 or both depending on where the N in ring A is located. $R_3$, $R_4$, $R_5$, $R_6$ and $R_8$ are hydrogen or other groups as defined below. The compounds lase in the blue-green to near ultraviolet region.

11 Claims, No Drawings

AZACOUMARIN DYE LASERS

BACKGROUND OF THE INVENTION

The invention described herein was made in the course of or under Interagency Agreement No. E(04-3)-1019 between the Energy Research and Development Administration and the United States Naval Weapons Center.

This invention relates to dye lasers. More particularly, this invention relates to dye lasers utilizing a new class of lasing compounds, specifically, a class of azacoumarin lasing compounds.

The fact that complex organic dye molecules can be induced to emit coherent laser light is well known and is described in, for example, M. R. Kagan, G. I. Farmer, and B. G. Huth, "Organic Dye Lasers", *Laser Focus* 4, pp 26–33, September 1968, and P. Sorokin, "Organic Lasers", *Scientific American*, pp 30–40, February 1969. The active medium of a typical organic dye laser consists of a dilute solution of the organic material dissolved in a common solvent such as water or alcohol. However, it is not necessary to use liquid solvents with the organic molecules; solid matrices, such as polymethyl methacrylate can also be used. The term "dye" laser is derived from several classes of organic dye compounds in which lasing has been produced. Actually, a great number of compounds useful in dye lasers do not fit the general classification of organic dyes.

A major advantage of the organic dye laser is its tunability, that is, the output of an individual laser can be changed continuously over a smaller range of wavelengths. This feature makes the dye laser particularly suitable for use in isotope separation processes based on selective photoexcitation of a particular isotopic species. A general description of laser isotope separation processes is given in C. Bradley Moore, "The Application of Lasers to Isotope Separation", *Accounts of Chemical Research* 6, pp 323–328, 1973. The narrow bandwidth and exact wavelength requirements of the excitation source generally require that a finely tunable laser be used.

Efficient lasers which operate in the blue to near ultraviolet region, particularly in the 350–400 nm region, are desirable for specific applications, particularly for specific isotope separation processes such as uranium isotope separation. At present, the most efficient laser dyes known with respect to low threshold, high slope efficiency, long-pulse, and continuous-wave (CW) operation are contained within the classes of the xanthenes, oxazines, carbazines, carbopyronins, and coumarins. The most blue-shifted of these reported to date is 7-amino-4-coumarin (Eastman Kodak dye coumarin 120) which lases at 440 nm in methanol.

Materials already known to lase in the 350 to 400 nm region such as quaterphenyl, diphenyl oxazole, diphenyl stilbene, and bis(phenyloxazol-2-yl)-benzene do not have low thresholds even for short-pulse, fast risetime flashlamp excitation, although some lase efficiently under nitrogen laser stimulation.

Azacoumarins are coumarins in which a CH group is replaced by a nitrogen atom. The preparation of 7-hydroxy-5-methyl-8-azacoumarin is described in R. Robinson and J. S. Watt, *J. Chem. Soc.* 1536 (1934) and R. B. Moffett, *J. Org. Chem.* 35 (11) 3596 (1970). The compound was obtained in the course of an attempt to synthesize meroquinenine or an equivalent substance which could be utilized as a starting point for synthetic work.

SUMMARY OF THE INVENTION

The present invention provides a dye laser comprising a lasing solution of a 7-substituted azacoumarin in which the aza nitrogen occupies at least one of the 5, 6 and 8 ring positions. The 7-substituent is hydroxy, alkoxy, amino, or substituted amino. Substituents may be attached to other ring positions as defined in detail below. The present dye lasers lase in the blue-green to near ultraviolet region.

It is, therefore, an object of this invention to provide a dye laser, particularly a dye laser which lases in the blue-green to near ultraviolet region.

It is a further object of this invention to provide a new class of lasing dyes, particularly dyes which lase in the blue-green to near ultraviolet region.

Still another object of this invention is to provide a method for producing coherent laser radiation, particularly at a wavelength in the blue-green to near ultraviolet region.

Other objects and advantages will become apparent from the following detailed description.

DETAILED DESCRIPTION OF THE INVENTION

The dye laser of the present invention includes a laser dye solution comprising a lasing concentration in a non-interfering solvent of a compound having the following general structure:

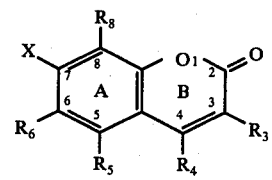

wherein a nitrogen atom is located in at least one of the 5, 6 and 8 positions of the A ring in lieu of the corresponding CR group; $R_3$ is hydrogen, alkyl, substituted alkyl such as alkaryl, alkyl ester or haloalkyl, aryl, substituted aryl such as tolyl, naphthyl or alkoxyaryl, cyano, or carboxyl; $R_4$ is hydrogen, alkyl, substituted alkyl such as alkaryl, alkyl ester or haloalkyl, aryl, substituted aryl such as tolyl, naphthyl or alkoxyaryl, cyano, carboxyl, hydroxy, or alkoxy; $R_5$, $R_6$ and $R_8$ are independently hydrogen, alkyl, hydroxy, alkoxy, halogen, alkylsulfonyl, arylsulfonyl, or sulfonamide; and X is hydroxy, alkoxy, amino, or substituted amino. The term "substituted amino" is used herein to include alkylamino, arylamino, acylamino, aracylamino, a heterocyclic nitrogen ring of preferably 5 or 6 members, and a group which taken together with $CR_6$ and/or $CR_8$ forms one or two 5 or 6 membered aliphatic heterocyclic rings attached to ring A.

In the above formula, $R_3$ is preferably hydrogen or lower alkyl; $R_4$ is preferably hydrogen, hydroxy, lower alkoxy, lower alkyl, or halo-substituted lower alkyl; $R_5$ and $R_6$ are preferably hydrogen; X is preferably hydroxy, lower alkoxy, amino, lower alkylamino, or morpholino; and a nitrogen atom preferably occupies the 8 ring position. The term "lower alkyl" is used to denote alkyl groups of less than 8 carbon atoms. Particularly suitable lasing compounds of the present invention are the 8-azacoumarins wherein $R_3$ is hydrogen or methyl; $R_4$ is hydrogen, hydroxy, methyl, methoxy, or halomethyl such as fluoromethyl; R₅ and R₆ are hydrogen; and X is hydroxy, methoxy, amino, methylamino, dimethylamino, or morpholino.

The laser dye solution is operably coupled with a pumping energy source capable of producing stimulated emission of the dye solution. Suitable pumping energy sources are well known to those in the art and include, for example, flashlamps or lasers, such as a nitrogen laser.

Suitable non-interfering solvents for use in the present dye laser are also well known in the art. Such common solvents as water and ethanol can be used; a solid matrix such as polymethyl methyacrylate can also serve. The solution may be saturated with oxygen or an inert gas. Some lasing dyes can also be used in the form of watersoluble salt.

The present invention also provides a novel class of compounds having the following structure:

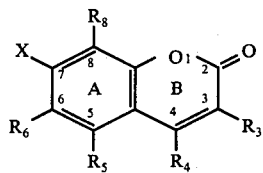

wherein at least one of the 5, 6 and 8 ring positions is occupied by a nitrogen atom in lieu of the corresponding CR group and X, $R_3$, $R_4$, $R_5$, $R_6$ and $R_8$ are groups as described above with the proviso that when a nitrogen atom occupies the 8 ring position, X is OH and $R_3$, $R_4$ and $R_6$ are hydrogen, then $R_5$ is hydrogen, alkyl of at least 2 carbon atoms, hydroxy, alkoxy, halogen, alkylsulfonyl, arylfulfonyl, or sulfonamide.

A tabular summary of compounds illustrative of the present invention is given in Table 1. The synthesis procedure for each of the compounds listed is hereinafter described in detail.

TABLE 1
8-AZACOUMARIN DYES

| Compound No. | X | $R_4$ | Yield % | m.p., °C | Recrystallized from |
|---|---|---|---|---|---|
| 1 | —OH | Me | 15 | 270,dec | DMSO |
| 2 | —N(CH₃)₂ | Me | 25 | 157-160 | Benzene/hexane |
| 3 | —N⌬O (morpholino) | Me | 90 | 175-176 | Benzene |
| 4 | —N⌬O (morpholino) | CF₃ | 95 | 218-219 | CH₃CN |

1. Preparation of 7-hydroxy-4-methyl-8-azacoumarin

Step A. 2,6-Dihydroxypyridine. 2,6-Dihydroxypyridine hydrochloride (10 g; 68 mmol) was suspended in 400 ml of water, and the pH was adjusted to about 3.5 by addition of concentrated aqueous ammonia. The flocculant white solid was filtered, dried in vacuo and used immediately without further purification.

Step B. 2,6-Dihydroxypyridine (2.22 g; 20 mmol), ethylacetoacetate (2.60 g; 20 mmol), and anhydrous Zncl₂ (2.72 g; 20 mmol) were mixed and heated at reflux in 25 ml of anhydrous methanol under a dry N₂ atmosphere with stirring for 8 hours. After standing at room temperature a red-orange solid was deposited (0.48 g) m.p. 295°-297° (DMSO); nmr (DMSO-d₆) δ2.40 (d, 3, J = 0.8 H₃, CH₃), 3.22 (bs, 1, O-H), 6.18 ( q, 1, J = 0.84z, H-3), 6.66 (d, 1, $J_o$ = 4 Hz, H-5), 8.04 (d, 1, J = 4 Hz, H-6); ir (KBr) 1750 cm⁻¹ (c = o). Anal. Calcd for C₉H₇NO₃: C, 61.01; H, 3.98; N, 7.91. Found C, 60.90; H, 4.00; N, 8.03.

2. Preparation of 7-dimethylamino-4-methyl-8-azacoumarin.

2-Dimethylamino-6-hydroxpyridine (1.1 g; 8 mmol) was heated at 150° in the presence of excess ethylacetoacetate (10 ml) for 66 hours. The excess ethylacetoacetate was removed by rotoevaporation to give a dark oil. Addition of methanol (~5 ml) gave a yellow solid precipitate. The solid was crystallized from benzene/hexane to give 210 mg (13%) of yellow crystals, m.p. 157°-160°; nmr (CDCl₃) δ 2.24 (d, z, J = 0.6 Hz, C-Me); 3.12 (s, 6, N-(Me)₂); 5.94 (q, 1, J = 0.6 Hz, H-3); 6.38 (d, 1, $J_{ortho}$ = 4 Hz, H-6); 7.62 (1, d, $J_{ortho}$ = 4 Hz, H-5). Anal. Calcd. for C₁₁H₁₂N₂O₂: C, 64.69; H, 5.92; N, 13.72. Found: C, 64.61; H, 6.03; N, 13.71.

3. Preparation of 7-morpholino-4-methyl-8-azacoumarin.

Step A. Preparation of 2-hydroxy-6-morpholinopyridine. 2-Chloro-6-hydroxypyridine (4.0 g; 31 mmol) was heated at reflux (T = 87°) in 25 ml of morpholine for 96 hours. Upon cooling morpholine hydrochloride, ~ 3.5 g (m.p. 160°-175°) precipitated. The hydrochloride was filtered and the green mother liquor concentrated to give a green solid. The solid was dissolved in 100 ml of benzene; treated with decolorizing charcoal and filtered. The emerald green solution deposited crystals upon cooling to 10°, 5.1 g (m.p. 136°-140°; 91% yield). Two grams of this material was recrystallized from 20 ml of acetonitrile to give 1.75 g of tan crystals, m.p. 135°-140°.

Step B. 2-Hydroxy-6-morpholinopyridine (2.0 g; 11 mmol) and ethylacetoacetate (5.1 g; 40 mmol) were mixed and heated at reflux for 60 hours to give a dark oil. The volatile materials were removed by rotoevaporation giving 3.6 g of semicrystalline black solid. This solid was washed with ether (100 ml) and twice crystallized from benzene to give tan needles, m.p. 188°-189°; ir (KBr), 1735 cm⁻¹ (C=O); nmr (CDCl₃) δ 2.36 (d, 3, J = 0.7 Hz, CH₃), 3.76 (m, 8, morpholino protons), 6.04 (d, 1, J = 0.7 Hz, H-3), 6.54(d, 1, J = 4.2 Hz, h-6), 7.69 (d, 1, J = 4.2 Hz). Anal. Calcd. for C₁₃H₁₄N₂O₃: C, 63.41; H, 5.73; N, 11.38. Found: C, 66.34; H, 5.69; N, 11.22.

4. Preparation 7-morpholino-4-trifluoromethyl-8-azacoumarin.

2-Hydroxy-6-morpholinopyridine (2.0 g; 11 mmol) and ethyl-4,4,4-trifluoromethylacetoacetate were heated at reflux for 60 hours. The volatile material was removed by rotoevaporation to give a crystalline mass. Crystallization from acetonitrile (75 ml) gave gold needles, 3.2 g (95%), m.p. 218°-220°; nmr (Acetone-d₆) δ 3.02 (s, 8, morpholino protons); 6.57 (s, 1, H-3); 6.94 (d, $J_{ortho}$ = 4.5 Hz, H-6); 7.90 (d of g, 1, $J_{ortho}$ = 4.5 Hz, $J_F$ = 1 Hz, H-5); ir (KBr) 1728 cm$^{-1}$ (C=O). Analo. Calcd. for $C_{13}H_{11}N_2O_3F_3$: C, 52.01; H, 3.69; F, 18.98; N, 9.33. Found: C, 52.33; H, 3.77: F, 19.14; N, 9.30.

Additional compounds illustrative of the present invention are those of the following structures:

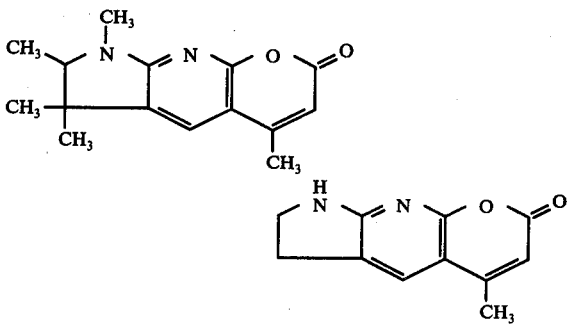

The present compounds were examined for lasing using a Phase-R Corporation DL-5 (0.5-cm-diam) coaxial flashlamp triggered by means of an EG&G, Inc. HY-3202 Thyratron to give typically 200-nsec rise time (10 to 90%) 500-nsec fullwidth half-maximum (FWHM) pulses (short-pulse operation). The laser cavity was equipped with a 3- or 4-meter-radius spherical mirror 29 cm from a 90% reflectivity output mirror. Antireflection coatings were employed on the output mirror and cell windows. Dye concentrations producing an absorbance of 4 cm$^{-1}$ were used. In some cases, the solution was saturated with oxygen or an inert gas.

Long-pulse operation was achieved by connecting the Phase-R flashlamp to a Candela Corporation Ed-625 electric driver, which used a 1.5 - $\mu$F capacitor and a spark-gap switch. Rise times varied from 400 nsec at 70 joules and higher energy to 800 nsec at 40 joules, whereas pulse width was around 2 $\mu$sec independent of input.

Laser output was monitored on a Tektronix, Inc. 7844 dual-beam oscilloscope using a United Detector Technlogy, Inc., PIN-6LC Schottky barrier photodiode, a Laser Precision Corporation RK-3232 energy ratiometer, and in Interactive Technology one-meter f/8.4 monochromator. Fluorescene spectra and quantum yields were measured on a G. K. Turner Model 210 spectrofluorometer.

The lasing properties under flashlamp excitation of 7-hydroxy-4-methyl-8-azacoumarin and 7-dimethylamino-4-methyl-8-azacoumarin are given in Table 1. For purposes of comparison, the lasing properties of a coumarin analog, 7-dimethylamino-4-methylcoumarin, are also given.

TABLE 1.

| Lasing Properties of 8-Azacoumarin Dyes[a] | | | |
|---|---|---|---|
| Compound | Threshold, J | Slope Efficiency $\times 10^3$ | Center of Lasing Range, nm |
| 7-Hydroxy-4-methyl-8-azacoumarin | 18 | 0.35 | 431 |
| 7-Dimethylamino-4-methyl-8-azacoumarin | 20 | 0.20 | 434 |
| 7-Dimethylamino-4-methylcoumarin | 12 | 0.58 | 453 |

[a]Ethanol solution saturated with air.

Dye laser output pulses (full length) of 1.2 $\mu$sec were obtained with 7-morpholino-4-methyl-8-azacoumarin in 10% water/isopropanol for 75 joules applied to the lamp.

By comparison with corresponding coumarin analogs, the fluorescence maxima of the present 7-substituted azacoumarins are substantially blue-shifted.

A major and important advantage of the present lasing dyes is that these dyes will produce long pulses under long pulse excitation. Consequently, the present lasing dyes are capable of operating CW (continuous wave).

The output wavelength of the dye lasers utilizing the present azacoumarin lasing dyes can be tuned by changing some parameter in the system in accordance with well known procedures, for example a grating, a prism or an etalon. The central wavelength also depends on the choice of solvent, optical path length, pump energy and concentration.

An advantage of the lasing dyes of the present invention is that different kinds of pumps can be used to make the dyes lase. For example, either a nitrogen laser or a flashlamp can be used as a pump.

Although the invention has been hereinbefore described with respect to specific examples, it will be appreciated that various changes and modifications will occur to those skilled in the art without departing from the spirit of the invention. Therefore, it is not intended to limit the invention except by the terms of the following claims.

What we claim is:

1. A dye laser comprising a laser dye solution and a pumping energy source operably coupled therewith and capable of producing stimulated emission of the dye solution, said dye solution comprising a lasing concentration in a non-interfering solvent, of a dye having the following formula

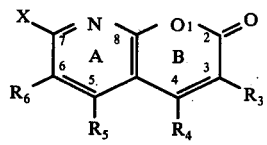

wherein $R_3$ is hydrogen; $R_4$ is hydrogen, methyl, or trifluoromethyl; $R_5$ and $R_6$ are hydrogen; and X is hydroxy, dimethylamino, or morpholino.

2. A dye laser accordinng to claim 1 wherein the lasing dye is 7-hydroxy-4-methyl-8-azacoumarin.

3. A dye laser according to claim 1 wherein the lasing dye is 7-dimethylamino-4-methyl-8-azacoumarin.

4. A dye laser according to claim 1 wherein the lasing dye is 7-morpholino-4-methyl-8-azacoumarin.

5. A dye laser according to claim 1 wherein the lasing dye is 7-morpholino-4-trifluoromethyl-8-azacoumarin.

6. A method for producing a coherent laser beam which comprises stimulating the emission of energy from molecules of a lasing compound having the following formula

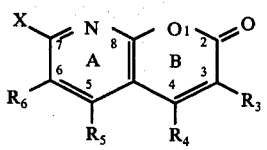

wherein $R_3$ is hydrogen; $R_4$ is hydrogen, methyl, or trifluoromethyl; $R_5$ and $R_6$ are hydrogen; an X is hydroxy, dimethylamino, or morpholino.

7. A method according to claim 6 wherein the lasing compound is 7-hydroxy-4-methyl-8-azacoumarin.

8. A method according to claim 6 wherein the lasing compound is 7-dimethylamino-4-methyl-8-azacoumarin.

9. A method according to claim 6 wherein the lasing compound is 7-morpholino-4-methyl-8-azacoumarin.

10. A method according to claim 6 wherein the lasing compound is 7-morpholino-4-trifluoromethyl-8-azacoumarin.

11. A method according to claim 6 wherein stimulated emission is achieved by optically pumping a laser gain medium comprising an amount of said lasing compound effective for the support of lasing in a non-interfering solvent to produce an energy population inversion in the lasing compound sufficient for laser action and stimulating the production of said laser beam in an optically resonant cavity.

* * * * *